July 7, 1964 W. S. THOMPSON 3,140,154
FURNACE WITH COMBUSTION ZONE CONTROL
Filed Sept. 30, 1958 5 Sheets-Sheet 3

INVENTOR
WENDELL S. THOMPSON

BY *Hans G. Hoffmeister*
ATTORNEY

July 7, 1964

W. S. THOMPSON 3,140,154

FURNACE WITH COMBUSTION ZONE CONTROL

Filed Sept. 30, 1958

FIG_6A

INVENTOR
WENDELL S. THOMPSON

BY Hans G. Hoffmeister

ATTORNEY

3,140,154
FURNACE WITH COMBUSTION ZONE CONTROL
Wendell S. Thompson, Los Gatos, Calif., assignor to FMC Corporation, a corporation of Delaware
Filed Sept. 30, 1958, Ser. No. 764,361
13 Claims. (Cl. 23—277)

This invention pertains to furnaces and more particularly relates to a furnace for carrying out the thermal fixation of atmospheric nitrogen.

In the thermal fixation of atmospheric nitrogen it is necessary to heat air to about 4000° F. at which temperature nitric oxide is formed. To recover this nitric oxide, the air and the nitric oxide therein must be rapidly cooled to a lower temperature in the order of 2500° F. because, in the temperature range between 4000° F. and said lower temperature, the nitric oxide is unstable and will decompose into free nitrogen and oxygen if the nitric oxide is subjected to this intermediate temperature range for too long a period. While nitric oxide is chemically unstable at said lower temperature also, the decomposition is immeasurably slow and, accordingly, the nitric oxide can be successfully further processed at or below said lower temperature.

Furnaces have previously been proposed for carrying out the thermal fixation of atmospheric nitrogen. However, they are generally unsuccessful due to the fact that they employ stationary pebble beds which become fouled due to the breaking up of the pebbles during the high temperature operation. Such furnaces remain operative for only a few days, after which they must be shut down so that the pebble beds can be rebuilt. Further, it has been found that, when such furnaces are made relatively large, the heating of the pebble bed is inefficient since it is difficult to distribute fuel gas uniformly over an extended area of pebble bed.

It is therefore an object of the present invention to provide an improved furnace capable of efficiently carrying out the thermal fixation of atmospheric nitrogen.

Another object is to provide an improved burner arrangement for a nitrogen-fixation furnace.

Another object is to provide a furnace having pebble beds that are automatically cleaned and rebuilt.

Another object is to provide an automatic control system for a nitrogen-fixation furnace.

These and other objects and advantages of the instant invention will become apparent from the following description and accompanying drawings, in which.

Figure 1:
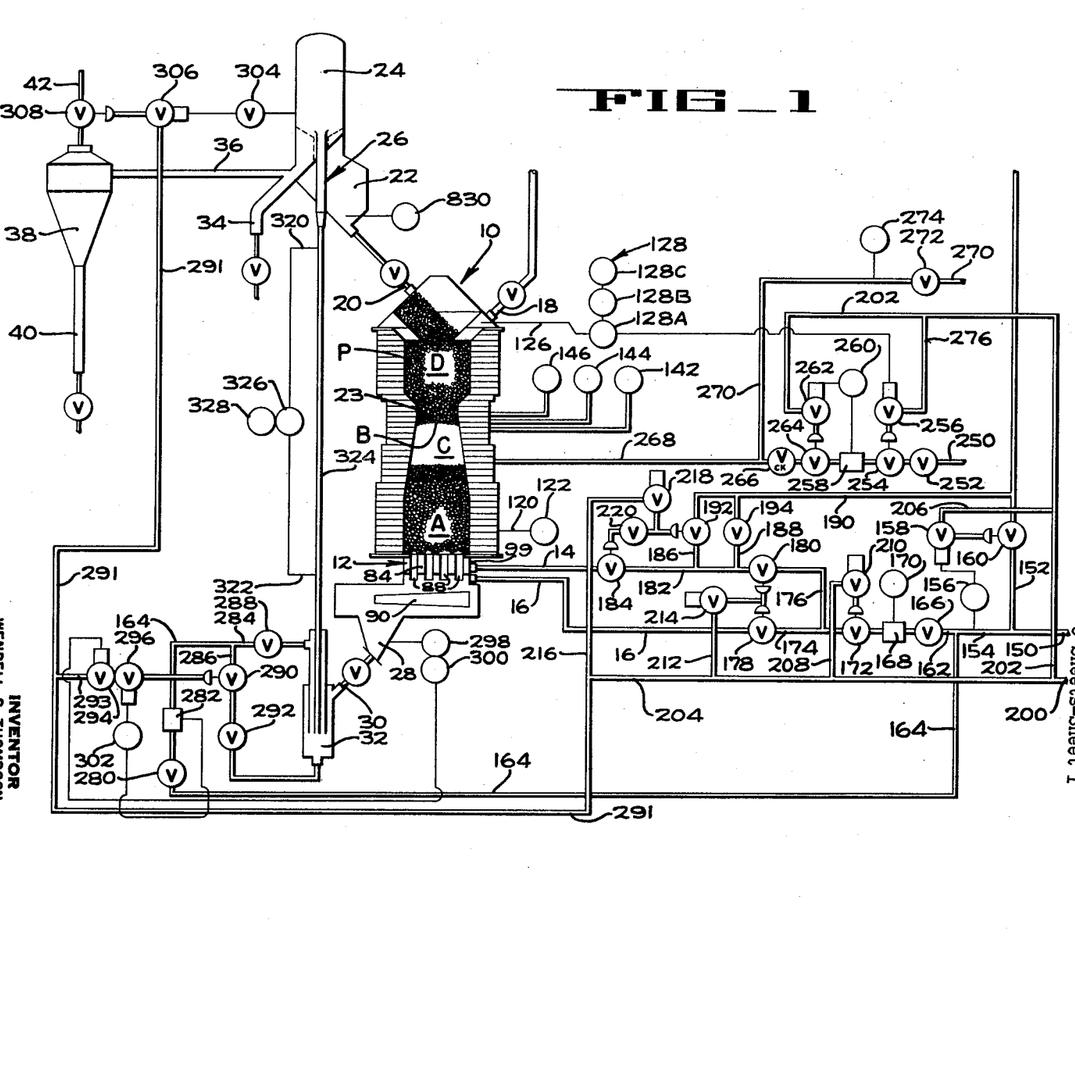
FIG. 1 is a schematic view of a complete furnace installation and the automatic control system therefor.

Referring now to the drawings, and particularly FIG. 1 thereof, the reference numeral 10 indicates a furnace constructed in accordance with the principles of the present invention. Atmospheric air to be treated is introduced through a grate assembly 12 of the furnace 10 by two air inlet conduits 14 and 16. The air flows upwardly through the furnace 10, is heated in a lower pebble bed A, further heated in an open combustion zone C, cooled in a quenching bed D and is then discharged through a discharge conduit 18 and conducted to a point of further treatment (not shown).

The beds A and D are formed of pebbles or similar small particles of material such as magnesia which are introduced at the upper end of the furnace 10 through a conduit 20 from a hopper 22 which communicates with a section 24 of an air lift pebble elevator 26 at which pebbles are disengaged from the air in which it is entrained. The section 24 will be called a disengager hereinafter. In the present furnace, a bridge B is formed at the lower end of the upper bed D due to the action of the upwardly moving air and to the interengagement of the pebbles at a Venturi throat portion 23 of the furnace. Periodically, the bridge B is purposely caused to collapse and permit the pebbles of the upper bed to drop onto the lower bed. The bridge is then reestablished and pebbles are withdrawn from the lower end of the lower bed through the grate assembly 12 so that the lower bed moves downwardly away from the upper bed. In this manner, the pebbles travel downwardly in step-by-step fashion through the furnace 10 and are discharged through the grate assembly 12 into a hopper 28. From the hopper 28 the pebbles move through a conduit 30 to a section 32, hereinafter called the engager, of the air lift elevator 26 and are swept up by upwardly moving air and raised to the disengager 24.

The disengager 24 is provided with suitable separating screens whereby the pebbles still of sufficient size to be reused are returned to the hopper 22 to be recycled through the furnace. The smaller pebbles are separated and discharged through a spout 34, and the air stream of the elevator, with the dust entrained therein, is directed through conduit 36 to a cyclone separator 38. The dust is discharged from the cyclone separator 38 through a spout 40, and the air is vented to atmosphere through a conduit 42.

Referring now to FIGS. 2, 3, 4 and 5, the furnace 10 is supported on a plurality of legs or pedestals 50 and comprises a base plate 52 which supports a plurality of ring shaped tiers 54 mounted one on top of the other and bolted together. The tiers 54 will be designated specifically as 54–1 through 54–34 numbered from bottom to top. Each of the tiers comprises an outer flanged metal ring 56 (FIG. 5) and a doughnut shaped section of refractory material 58. The outer edge of the refractory material 58 is spaced inwardly from the ring 56 and a plurality of annular metal reflecting radiation shields 60 are inserted in the space thereby provided. A flat annulus 61 of metal, which may be made of nickel, is placed between each of the tiers.

It has been found that in the high temperature treatment of gases in furnaces, a considerable portion of the gas tends to travel through cracks formed in the refractory and bypass the treatment zone. The provision of the annuli 61 materially reduces the amount of gas bypassed in this manner by forcing the gas to return to the central bore of the furnace.

The upper end of the furnace 10 is provided with a cone-shaped cover 66 (FIG. 2) fastened to the ring 56 of the uppermost tier 54–34. An inverted truncated cone-shaped baffle 68 is fastened to the underside of the cover 66 and together therewith forms a hopper or chamber 70 adapted to receive the pebbles P from the conduit 20 and distribute them within the bore 62 of the furnace. The discharge conduit or stack 18 is connected to the cover 66 outside of the baffle 68.

The grate 12, disposed at the lower end of the furnace 10 for controlling the flow of the pebbles P therethrough, comprises a grate plate 80 (FIGS. 2 and 4) fixed to the furnace base plate 52, and a second plate 82 parallel to and spaced below the plate 80 to form a plenum chamber 84 therebetween. The previously described air supply conduit 14 communicates with the plenum chamber 84. The grate plate 80 is provided with a plurality of small openings or bubble caps 86 (FIG. 4) to permit air to enter the furnace bore 62 from the plenum chamber 84 while preventing the pebbles P from entering the plenum chamber.

A plurality of vertical pebble discharge tubes 88 extend through the plenum chamber 84 and are sealed to both the plates 80 and 82 through which they extend. The tubes 88 are open at both their upper and lower ends. The lower ends of the pebble discharge tubes 88 (FIG. 2) terminate above an inclined vibrating conveyor plate 90 which is adapted to be reciprocated by a motor 92, suitably mounted on a pedestal 94 adjacent the grate assembly 12 and connected to the conveyor plate 90 by a linkage 96. When the motor 92 is actuated, the plate 90 reciprocates and conveys the pebbles P to the left, as viewed in FIG. 2, from beneath the tubes 88 until they drop through an opening 98 in the plate 90 into the hopper 28 leading to the pebble engager 32.

The whole of the grate assembly 12 is encased within an air tight shell 99, which provides a side wall for the plenum chamber 84. The main air supply conduit 16 is connected to and projects through the shell at a point below the plate 82 whereby the main furnace air supply is directed upwardly through the pebble discharge tubes 88. As long as the air supply is directed upwardly through the tubes 88, bridges BB will be formed by the pebbles P at the upper ends of the tubes. As long as the bridges BB are maintained, the pebbles will not pass downwardly through the tubes 88. When it is desired to withdraw pebbles through the grate, it is merely necessary to decrease the air flow through the conduit 16 causing the bridges BB to collapse. The total air flow through the furnace 10 may be kept constant by simultaneously increasing the flow through the conduit 14, in the manner described hereinbelow, when the air flow through conduit 16 is decreased.

Figure 2:
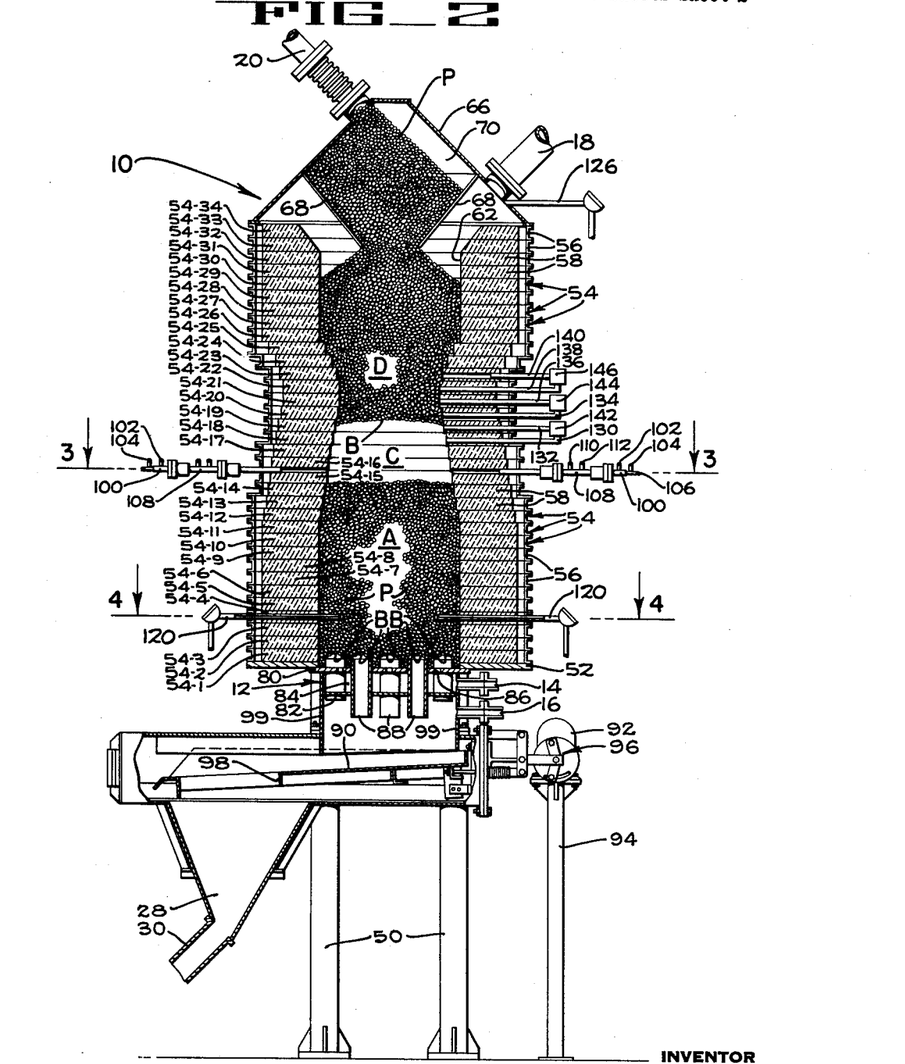
FIG. 2 is an enlarged vertical section taken centrally through the furnace of FIG. 1.
Figure 3:
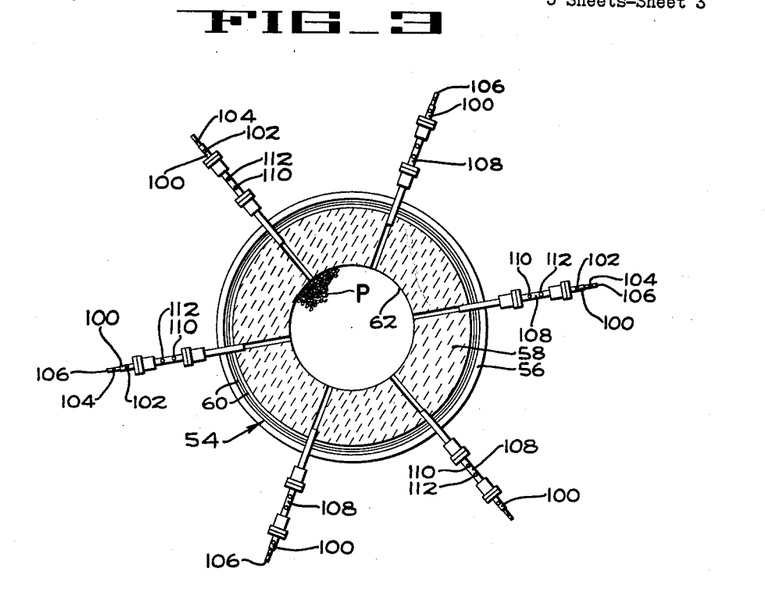
FIG. 3 is a horizontal section taken on line 3—3 of FIG. 2.
Figure 4:
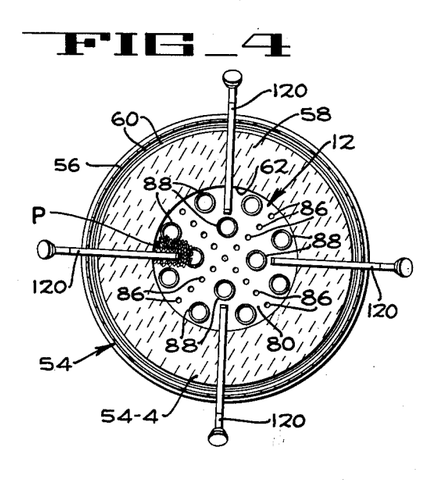
FIG. 4 is a horizontal section taken on line 4—4 of FIG. 2.
Figure 5:
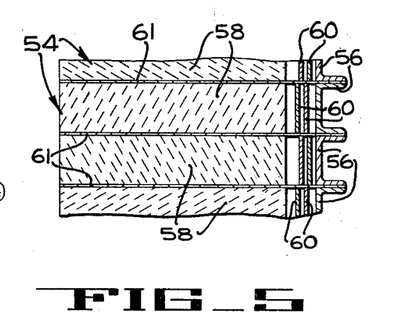
FIG. 5 is a fragmental vertical section of a portion of the furnace wall.

Six water cooled burners 100 (FIGS. 2 and 3) are used in the furnace 10 and are placed equidistant around the circumference of the furnace in the manner illustrated in FIG. 3. Cooling water is circulated through the burners 100 through two water connections 102 and 104 (FIG. 2) while the fuel is supplied through a line (not shown) that may be connected to the burners at 106. The burners 100 are each removably inserted through a cooling jacket 108 which is provided with connections 110 and 112 through which cooling water may enter and leave the jacket.

Four temperature responsive probes 120 (FIGS. 2 and 4) project into the central bore 62 of the furnace at a point adjacent to and above the grate 12 and are responsive to the temperature of the pebbles P at this point. The four probes 120 are connected to a common temperature responsive control unit 122 (FIG. 1) which is associated with a main timer control circuit to prevent withdrawal through the grate 12 of pebbles that have a temperature above a certain predetermined temperature, in a manner described hereinbelow.

A similar temperature responsive probe 126 is installed either at the upper end of the furnace or in the stack 18 and is responsive to the temperature of the gases being vented through the stack 18. The probe 126 is connected to a temperature responsive control unit 128 the function of which will be described below.

Six pressure taps 130, 132, 134, 136, 138 and 140 (FIG. 2) are located in the tiers 54–18 through 54–23, respectively, adjacent the restricted throat portion 23 of the bore 62 through the furnace 10. The two lowermost pressure taps 130 and 132 are connected to a differential pressure indicating and control mechanism 142, the two center taps 134 and 136 are connected to a differential pressure indicator 144, and the upper two taps 138 and 140 are connected to a differential pressure indicator 146. The differential pressure indicators 142, 144 and 146 are employed to locate the point within the bore at which the bridge B supporting the upper bed of pebbles has been formed. A high differential pressure indicates that the bridge is below the pressure taps associated with the instrument so indicating, while a low pressure differential indicates that the bridge is above said pressure taps. The upper two instruments 144 and 146 are merely indicators and perform no control function. The lowermost instrument 142 is adapted to actuate an alarm circuit, in a manner to be described, to indicate either an excessively low, or a collapsed, bridge.

The main furnace air supply enters the system in the lower right hand corner of FIG. 1 through conduit 150 from the main air blowers (not shown). Some of the air is bled through a vent conduit 152 so that the pressure in a conduit 154 is maintained constant regardless of the fluctuating demands of the furnace system. The constant pressure in the conduit 154 is maintained through the use of a pressure responsive unit 156 connected to the conduit 154 and controlling a valve 158 which meters the control air to an air operated valve 160 in the vent conduit 152 whereby the amount of air bypassed through the conduit 152 is automatically controlled in response to the pressure in the conduit 154.

Beyond the pressure unit 156, the conduit 154 splits into two branch conduits 162 and 164. The conduit 164 is the air supply line for the pebble air lift elevator assembly 26, and the conduit 162 is the main furnace air supply conduit. A manually operated, normally open valve 166 is installed in the conduit 162 whereby the flow of air to the furnace 10 may be shut off manually at any time. Beyond the valve 166 is an orifice 168 connected with a flow recording control unit 170 adapted to actuate an alarm circuit, described below, in the event that the flow through the conduit 162 falls below a predetermined value. An air operated pulse valve 172 is connected in the conduit 162 beyond the orifice 168 to momentarily interrupt the air flow, when actuated by the control system to be described, and thus cause the collapse of the pebble bridge in the furnace 10.

On the downstream side of the pulse valve 172, the conduit 162 branches into two conduits 174 and 176. The conduit 174 extends into one side of an air operated control valve 178, the purpose of which will subsequently be described. The other side of the valve 178 is connected to the conduit 16 which, as previously described, is connected to the casing 99 of the grate assembly 12.

The conduit 176 communicates with one side of an air operated control valve 180, the other side of which is connected to a conduit 182 which in turn in connected to another air operated control valve 184. The other side of the valve 184 is connected to the previously described conduit 14 which delivers air to the plenum chamber 84 of the grate assembly 12.

Two parallel bypass conduits 186 and 188 are each connected at one end to the conduit 182 at a point therein located between the valves 180 and 184 and are each connected at the other end to a conduit 190 which communicates with the previously described vent conduit 152. An air actuated control valve 192 controls the flow through the bypass conduit 186, while a manual valve 194 controls the flow through the bypass conduit 188.

The control air conduit for the system thus far described comprises a conduit 200 connected to a suitable source of high pressure control air (not shown). The conduit 200 branches into two conduits 202 and 204. A branch conduit 206 connects the conduit 202 with the previously described solenoid actuated valve 158.

A branch conduit 208 connects the conduit 204 with a solenoid actuated valve 210 which controls the admission of control air to the pulse valve 172. A similar branch conduit 212 connects the conduit 204 and a solenoid actuated control valve 214 which simultaneously controls the admission of control air to the valves 178 and 180. A similar branch conduit 216 connects the conduit 204 with a solenoid actuated control valve 218 which simultaneously controls the admission of control air to the valves 184 and 192. A manual valve 220 is inserted between the solenoid valve 218 and the valve 184, whereby, the valve 184 may be removed from the control of valve 218 by closing the valve 220.

The gaseous fuel for the furnace enters the system by a conduit 250 from a suitable supply source (not shown). The fuel first passes through a manually actuated valve 252 which permits manual shut off of the fuel supply. The fuel then passes through an air operated valve 254 which is maintained in its open position by control air entering through a normally energized solenoid valve 256. If the electrical circuit to the solenoid valve 256 is opened, the valve closes and shuts off the control air to the valve 254 which then automatically closes to shut off the fuel supply to the furnace burners.

After passing through valve 254, the fuel passes through an orifice 258 to which a flow responsive controller 260 is attached. The flow responsive controller 260 actuates a solenoid valve 262 in response to the flow of fuel in the main line 250 to regulate the admission of control air to an air controlled flow regulating valve 264 downstream from the flow orifice 258. After passing through the flow regulating valve 264, the fuel passes through a check valve 266 and enters a conduit 268 which directs the fuel to each of the six burners.

Air for the fuel-air mixture, from a source not shown, is introduced to the conduit 268 through a conduit 270 equipped with a manual regulating valve 272 and a pressure indicating instrument 274.

Control air for the two air operated valves 254 and 264 is supplied through the previously mentioned conduit 202 which is connected to the solenoid actuated valve 262 and to a branch conduit 276, which connects conduit 202 with the solenoid actuated valve 256.

As previously stated, the air supply for the pebble lift elevator is supplied through conduit 164. A manual valve 280 is provided in the conduit 164 whereby the air supply therethrough may be shut off if desired. After passing through the valve 280, the air passes through a flow measuring orifice 282. The conduit 164 then branches into two conduits 284 and 286. Conduit 284 is a bypass conduit through which a predetermined amount of air is continuously bypassed through a manually settable regulating valve 288 to the air lift elevator 26. The amount of air thus bypassed is insufficient to lift pebbles from the engager 32 but is sufficient to maintain the engager 32, the disengager 24, and the cyclone separator 38 under a predetermined pressure.

The second conduit 286 is the main air supply for the air lift elevator assembly 26. This conduit contains an air operated valve 290 and a manually operated valve 292 which may be preset to predetermine the maximum air flow when valve 290 is opened.

Air for the operation of the valve 290 is supplied through a conduit 291 connected to the previously described conduit 204, and a branch conduit 293 through two solenoid actuated valves 294 and 296.

A level responsive control instrument 298 has an element located in the grate hopper 28 and is adapted to energize a time delay relay 300 when the pebbles being discharged from the grate 12 reach a predetermined level in the hopper. When a predetermined time interval has elapsed after the level has been reached, the relay 300 actuates the solenoid to open valve 294 and permit the control air to pass through the normally open valve 296 to open the valve 290. When the valve 290 opens, the air flow through the conduit 164 increases greatly. This increased air flow is registered on a flow responsive controller 302 connected to the flow orifice 282 and this controller then regulates the solenoid valve 296 which in turn controls the flow through the valve 290.

As previously described, air from the bypass conduit 284 flows into the elevator system 26 continuously to maintain the control system under a predetermined pressure. This pressure is maintained and controlled through a pressure responsive control unit 304 which actuates a solenoid valve 306 connected to the control air conduit 291 to regulate the amount of control air reaching an air operated valve 308 in the discharge vent stack 42 of the cyclone separator 38.

Two pressure taps 320 and 322 are located one adjacent the upper end and one adjacent the lower end of the vertical conduit 324 of the elevator assembly 26. The pressure taps 320 and 322 are connected to a differential pressure responsive controller 326 which is adapted when energized to actuate an alarm, generally indicated 328, if the differential pressure is smaller than a predetermined amount.

*Operation*

To put the furnace in operation, pebbles are directed into the furnace from the supply line 20 (FIG. 1) until the entire furnace is filled. A master control switch, which will be described in connection with a description of the control circuit is manually thrown to the manual-control operating position. Air control valve 166 (FIG. 1) is then opened to cause air to flow into the furnace and upwardly through the pebbles. A second manual switch of the control mechanism is then closed to actuate valve 214 which causes valve 178 to close, thus reducing the amount of air flowing upwardly through the grate tubes 88, and simultaneously causes the valve 180 to open increasing the air flow through conduit 14, whereby the total furnace flow of air is maintained constant to form and support the main bridge B, while the pebbles are permitted to move downwardly through the tubes 88 onto the vibrating conveying plate 90, thus opening the combustion zone C. After about 12 seconds, the second control switch is opened causing the flow of air upwardly through the grate tubes to be resumed to establish the bridges BB, and the flow through conduit 14 is simultaneously reduced.

The forming of the bridge B and its location may be determined by inspecting the differential pressure instruments 142, 144 and 146. The water cooled burners 100 (FIG. 2) are then inserted through the furnace wall and lit in any suitable manner, as by use of an oxyacetylene lance. When the temperature of the process gas leaving the furnace reaches a predetermined level, the bridge will automatically be dumped, in the manner described hereinbelow, and the above manual operations are repeated to reestablish the open combustion zone. After several manually controlled cycles of the furnace have been performed in the manner just described, the temperature within the furnace will be raised sufficiently to support automatic operation and the master control switch is again actuated to place the furnace under automatic control.

When the furnace reaches the proper operating temperature, the process air passing upwardly therethrough will be partially converted to nitric oxide in the combustion zone. Then the process air and the entrained nitric oxide are rapidly cooled as they pass upwardly through the upper pebble bed D and out through the stack 18 to suitable processing equipment.

In cooling the air and the nitric oxide, the pebbles of the upper pebble bed are heated and eventually the layer of pebbles closest to the combustion zone becomes too hot for further use as a cooling medium. The temperature of the pebbles of this lower layer is reflected in the temperature of the gases in the discharge conduit 18. Accordingly, when the temperature of the gases in conduit 18 reaches the lowest of three temperature settings of controller unit 128, the unit 128 goes into operation to start the automatic control cycle. At this time, air is entering the furnace through conduits 14 and 16. To break the bridge B, while keeping the bridges BB at the grate tubes intact, the amount of air entering the furnace through conduit 14 is reduced so that the total quantity of air flowing through the furnace is reduced below the amount necessary to support the upper bridge B. The upper bridge B breaks, causing the hot layer of pebbles to drop down onto the lower pebble bed. The air flow through the furnace is then returned to normal. The lower bridges BB are then broken to drop the lowermost pebbles of the lower bed out of the furnace. At this time a new upper bridge B is formed at the restricted throat and the pebbles of the lower pebble bed A drop away from the new bridge to again open the combustion zone C.

After pebbles have been discharged through the grate tubes 88 until the grate is full, a period of about 12 seconds, the flow of air through the conduits 14 and 16 is once more adjusted, the quantity of air flowing through conduit 16 being increased to cause the reforming of the lower bridges BB, and the quantity flowing through conduit 14 being decreased to maintain the total quantity flowing through the furnace at the desirable amount.

It will be noted that the control unit 128 in the discharge conduit 18 has three temperature settings, the lowest controls the above-described automatic breaking of the upper bridge. The next higher temperature setting of unit 128 is arranged to actuate an alarm when the temperature of the air in conduit 18 reaches that temperature level. The third setting is arranged to automatically cut off the fuel supply to the burners if and when the temperature of the gases reaches that elevated temperature. This unit could also be arranged to cut off the flow of process air if desired.

The control unit 122 is sensitive to the temperature of pebbles in the lower bed. Since the pebbles discharged from the lower bed will be cleaned and delivered rather quickly to the furnace supply hopper 22 to be used as a cooling agent in the upper bed, it is necessary that the pebbles are at a relatively low temperature when they are dropped from the furnace. Accordingly, the control unit 122 is connected into the timer circuits in such a manner that the pebbles are not dumped until they have been cooled, by upwardly flowing air, to a desirable low temperature.

When the pebbles are dumped from the furnace onto the vibrating conveying plate 90, they are delivered to the lower end of the air operated pebble elevator 26 where they are contacted by the air in the pebble engager section 32 and lifted to the pebble disengager section 24. In the disengager section 24, the undersize pebbles are screened off through conduit 34, dust and the like is pulled into cyclone separator 38, and reusable pebbles are directed into hopper 22 to be returned to the furnace.

*Control System*

Figure 6A:
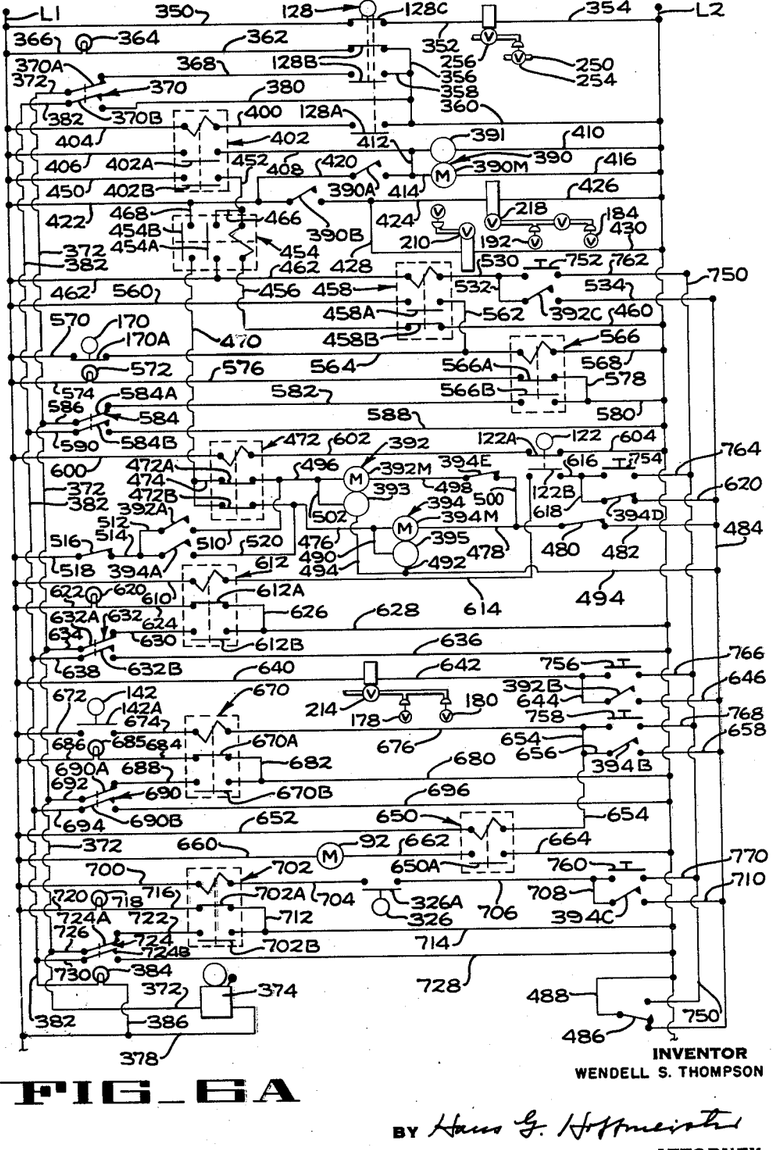
FIGS. 6A and 6B together form a complete wiring diagram of the furnace operating controls.
Figure 6B:
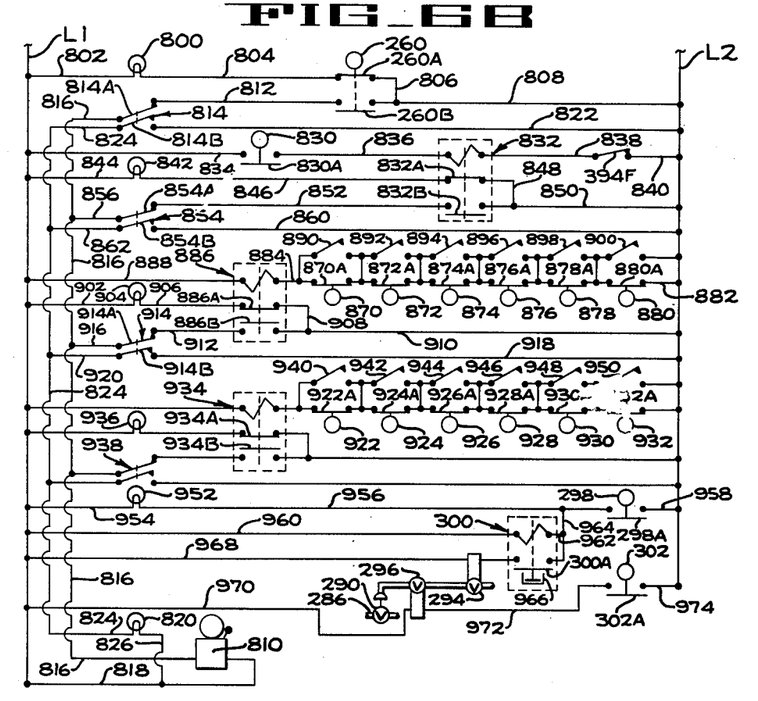

The electrical system for controlling the above-described furnace operation is illustrated in FIGS. 6A and 6B and comprises two main leads L1 and L2 connected to any suitable source of power (not shown). The temperature responsive control unit 128, previously described as being mounted in the vent stack 18, is shown at the top central portion of FIG. 6A. The unit 128 is provided with three sets of contacts, a normally open contact 128A adapted to be closed when the temperature in the stack 18 reaches a predetermined minimum temperature, a double contact 128B adapted to be actuated if the temperature in stack 18 exceeds the set temperature for contacts 128A and reaches an intermediate predetermined temperature, and a single normally closed contact 128C adapted to be opened if the temperature in the stack 18 exceeds the settings of both 128A and 128B and reaches a predetermined maximum value.

The contact 128C completes a circuit which includes a lead 350 connected to L1, the contact 128C, a lead 352, the solenoid actuated valve 256, and a lead 354 which is connected to L2. When contact 128C opens, valve 256 is permitted to close to cut off the control air to valve 254 which then closes to shut off the fuel supply line 250 to the furnace.

One side of the double contacts 128B is connected by leads 356, 358 and 360 to L2. The other side of the normally closed contact of double contact 128B is connected by lead 362 to one side of a green pilot light 364, the other side of which is connected by lead 366 to L1. The other side of the normally open contact of double contact 128B is connected by lead 368 to one side of a normally closed contact 370A of a double switch 370. The other side of the normally closed contact 370A is connected by lead 372 to one side of an alarm bell 374 (at the lower end of diagram 6A), the other of which is connected by lead 378 to L1. One side of a normally open contact 370B of the switch 370 is connected by leads 380, 356 and 360 to L2. The other side of contact 370B is connected by lead 382 to one side of a red tell-tale light 384, the other side of which is connected by leads 386 and 378 to L1.

When the temperature in the stack 18 reaches the set point for the contacts 128B, the normally closed contact opens, thus breaking the circuit to the green pilot light 364, and the normally open contact closes to complete the circuit to the alarm bell 374. The operator can silence the alarm bell by throwing the switch 370 to break the circuit to the bell, but when the switch 370 is so thrown it automatically energizes the circuit to the red light 384 to show that the circuit to the alarm bell has been disconnected.

Turning now to contact 128A of the temperature responsive control unit 128, this contact, as previously described, is set to be actuated by the control unit 128 at the lowest of the three set temperature points of the unit and is the contact which initiates the action of three timers 390, 392 and 394, and energizes their associated electrically operated clutches 391, 393 and 395, respectively. It is to be noted that each timer is a conventional unit comprising a motor, a motor shaft, a timer shaft having contacts carried thereby, and a clutch for connecting the motor shaft to the timer shaft. To aid in following the wiring diagram (FIGS. 6A and 6B) and the timing chart (FIG. 7), the motor of each timer and each of the contacts of each timer have been given the same reference numeral as the timer with a letter appended thereto. Thus, the motor of timer 390 is designated 390M and the contacts are designated 390A and 390B. The contacts associated with timer 392 are designated 392A, 392B and 392C and the motor is designated 392M. Similarly, the contacts associated with timer 394 are designated 394A, 394B, 394C, 394D, 394E and 394F and the motor is designated 394M.

One side of contact 128A is connected to L2 by the previously mentioned lead 360. The other side of contact 128A is connected by lead 400 to one side of the actuating coil of relay 402. The other side of relay 402 is connected by a lead 404 to L1.

When the contact 128A closes, the relay 402 is energized to close the relay contacts 402A and 402B thereof. The relay contact 402A closes a circuit comprising L1, lead 406, relay contact 402A, lead 408, clutch 391, lead 410, and L2, and also closes a branch circuit from lead 408 through leads 412 and 414, timer motor 390M, lead 416, and L2, thus energizing both the timer motor 390M and its associated clutch 391.

The lead 414, which is connected to the L1 side of the timer motor 390M and through leads 412 and 408 to the L1 side of the clutch 391, is connected to one side of the timer contact 390A. The other side of the timer contact 390A is connected by leads 420 and 422 to L1, whereby, when timer contact 390A is closed by initiation of movement of the timer 390, it acts as a holding circuit to complete the cycle of the timer even after relay 402 opens.

The lead 422 connects L1 with one side of timer contact 390B. The other side of timer contact 390B is connected by lead 424 to one side of solenoid valve 218, the other side of which is connected by lead 426 to L2. A branch circuit connects lead 424 through a lead 428 to one side of solenoid valve 210, the other side of which is connected by lead 430 to L2. When the timer contact 390B is closed by the action of timer 390, both of the solenoid valves 218 and 210 are energized to perform their functions in the manner described hereinbelow.

When the relay 402 is energized, the relay contact 402B closes and energizes a relay 454 through the following circuit from L1 through lead 450, relay contact 402B, lead 452, the coil of relay 454, lead 456, the normally closed relay contact 458B of a relay 458, and lead 460 to L2. As soon as relay 454 closes, a holding circuit therefor is established through lead 462 connected to L1, lead 464, relay contact 454A, and lead 466 to the L1 side of the coil of relay 454, lead 456, relay contact 458B and lead 460 to L2. Through this holding circuit relay 454 will remain energized, even if contact 128A opens and deenergizes relay 402, until relay 458 is energized, in a manner to be described, to open relay contact 458B.

One side of relay contact 454B of relay 454 is connected by lead 468 to lead 422 which, as previously mentioned, is connected to L1. The other side of relay contact 454B is connected by lead 470 to one side of relay contact 472B of a normally energized relay 472, and by a branch lead 474 to one side of the relay contact 472A. The other side of relay contact 472B is connected by lead 476 to the timer motor 394M. A lead 478 connects the other side of timer motor 394M to one side of a hold switch 480, the other side of which is connected by a lead 482 to a lead 484. The lead 484 is selectively connected to L2 through a double pole double throw switch 486 and a lead 488. A branch lead 490 connects lead 476 to the clutch 395, and leads 492 and 494 connect the other side of the clutch 395 to the line 484. A lead 496 connects the other side of relay contact 472A with timer motor 392M. The other side of timer motor 392M is connected by lead 498 to one side of timer contact 394E, the other side of which is connected by lead 500 with lead 478 between timer motor 394M and hold switch 480. A branch lead 502 connects lead 496 with clutch 393, the other side of which is connected to line 484 by the previously mentioned lead 494.

Once the timer motors 392M and 394M have been started through the use of the circuits just described, a more direct holding circuit for each is established by the closing of the timer contacts 392A and 394A, respectively. The holding circuit for timer motor 392M comprises lead 510 connected between lead 496 and contact 392A, the other side of which is connected by leads 512 and 514 to a re-set switch 516. The switch 516 is connected by lead 518 to L1 thus bypassing relays 454 and 472. The lead 514 is connected to one side of timer contact 394A and the other side thereof is connected by a lead 520 to lead 476 providing a similar bypass for timer motor 394M.

After the timer motors 392M and 394M are stated, and the holding circuits therefor are established by the closing of timer contacts 392A and 394A at the end of the seconds (see FIG. 7), the timer contact 392C closes after an interval of seven seconds (FIG. 7) to energize the relay 458 through a circuit comprising L1, lead 462, the coil of relay 458, lead 530, lead 532, timer contact 392C, and lead 534 to line 484 which, as previously described, is connected to L2 through selector switch 486. When the relay 458 is actuated the relay contact 458B opens and breaks the holding circuit to relay 454, permitting it to reset for the next cycle.

The energizing of relay 458 closes relay contact 458A during the period from seven to forty seconds and completes a bypass circuit comprising L1, lead 560, relay contact 458A, leads 562 and 564 to one side of the coil of a relay 566. The other side of the coil of relay 566 is connected by lead 568 to L2. The relay 566 is part of the low air flow alarm system associated with the main air flow conduit and the circuit just described overrides this alarm circuit during the period of from seven to forty seconds when the air flow will normally be interrupted beyond the limits of the alarm controller 170 by the actuation of the valves 184, 192 and 210 to collapse the bridge.

The normal low-air-flow alarm circuit comprises lead 570 connecting L1 with the previously described flow responsive control unit 170 connected to the orifice 168 in the main air conduit 154 (FIG. 1). As long as the relay 566 remains energized, either through the circuit: L1, lead 570, contact 170A of unit 170, line 564, relay 566 and lead 568 to L2, or through the override circuit described above, the green pilot light 572 remains lighted through a circuit comprising L1, lead 574, light 572, lead 576, relay contact 566A, lead 578 and lead 580 to L2. When the relay 566 is deenergized by the opening of the contact 170A of unit 170, at any time other than the period of between seven and forty seconds after the timers start and the override circuit is established, the contact 566A opens, breaking the circiut to the green pilot light 572, and the contact 566B closes to establish the alarm circuit as follows: from L2, through lead 580, relay contact 566B and lead 582 to switch contact 584A of switch 584, and lead 586 to lead 372, which as previously described, is connected to the alarm bell 374. As explained above in connection with the high temperature alarm circuit associated with the vent stack 18, the operator may silence the alarm bell by throwing the manual switch 584 to open the switch contact 584A. When the switch 584 is thus thrown, it closes switch contact 584B to automatically establish a circuit to the red telltale light 384 comprising L2, lead 588, switch contact 584B and lead 590 to lead 382 previously described as connected to light 384.

As set forth above, the initiating circuits for the timer motor 392M and 394M pass through the relay contacts 472A and 472B, respectively, of the relay 472, whereby, the timer motors 392M and 394M can not be started unless relay 472 is energized. The energizing circuit for relay 472 comprises L1, lead 600, the coil of relay 472, lead 602, contact 122A of the temperature responsive controller 122, lead 604 and L2. As described above, the unit 122 is connected to the four temperature probes 120 (FIG. 4) adjacent the furnace grate. Contact 122A remains closed as long as the pebble temperature adjacent the grate remains low enough to safely discharge pebbles through the grate. If the temperature of the pebbles adjacent the grate is above the predetermined safe level, the unit 122 opens contact 122A to deenergize relay 472 thus disabling the initiating circuits for the timer motors 392M and 394M so that they can not be started, and at the same time closes contact 122B to energize a grate high-temperature alarm circuit as follows. A lead 610 connects L1 with one side of the coil of a relay 612, and a lead 614 connects the other side of the coil of relay 612 with one side of contact 122B. The other side of contact 122B is connected by leads 616 and 618 to one side of timer contact 394D, the other side of which is connected by lead 620 to line 484 which as previously mentioned is connected to L2. The timer contact 394D is opened during the period from eight to two hundred and ninety seconds after intiation of time motor 394M to disable the alarm circuit during this period, when it is normal to have high temperature pebbles adjacent the temperature probes 120, thus actuating the unit 122 to close contact 122B.

The high grate temperature alarm circuit comprises a green pilot light 620 normally energized through a circuit from L1 through lead 622, light 620, lead 624, relay contact 612A, lead 626 and lead 628 to L2. When the relay 612 is energized, relay contact 612A opens to disconnect light 620, and relay contact 612B closes to connect lead 628 to lead 630 which in turn is connected to one side of switch contact 632A of a switch 632 having double contacts. The other side of switch contact 632A is connected by a lead 634 to lead 372 previously described as connected to the bell 374.

As described above in connection with the other alarm circuits, the operator may silence the bell 374 by throwing the double switch 632 to open the switch contact 632A. Again when the switch 632 is thus thrown, it automatically establishes a circuit for the red telltale light 384 comprising L2, a lead 636, switch contact 632B, and lead 638 to lead 382 which as previously described is connected to light 384.

The timer contact 392B controls a circuit to solenoid valve 214 which comprises L1, lead 640, solenoid valve 214, leads 642 and 644, timer contact 392B, and lead 646 to lead 484. When timer contact 392B is closed during the period from eight to twenty seconds after the start of the timers, solenoid valve 214 is opened to close valve 178 and to open valve 180 (FIG. 1) to bypass the flow of the process air from the grate 12 into the plenum chamber 84 (FIG. 2) around the tubes 88, thus permitting pebbles to flow downwardly therethrough onto the conveying plate 90.

The timer contact 394B controls the action of the transport plate 90 of the grate 12 by energizing a relay 650 through a circuit comprising L1, lead 652, the coil of relay 650, leads 654 and 656, timer contact 394B, lead 658 and lead 484. When the relay 650 is actuated, the circuit to the conveying plate motor 92 is established as follows: L1, lead 660, motor 92, lead 662, timer contact 650A, and lead 664 to L2.

The timer contact 394B simultaneously controls the energizing or deenergizing of the bridge location alarm circuit which comprises the differential pressure responsive controller 142 and a relay 670. The alarm circuit extends from L1, through lead 672, contact 142A of the differential pressure controller 142, lead 674, relay 670, lead 676, previously mentioned leads 654 and 656, timer contact 394B and lead 658 to line 484. One side of each of the relay contacts 670A and 670B are connected to L2 by leads 680 and 682. The other side of normally closed relay contact 670A is connected by lead 684 to a green pilot light 685 and the other side of the pilot light 685 is connected by lead 686 to L1. The other side of normally open relay contact 670B is connected by lead 688 to switch contact 690A of a manual switch 690. The other side of switch contact 690A is connected by lead 692 to lead 372 which has previously been described as connected to the alarm bell 374.

If the unit 142 is actuated to close its contact 142A during the period from thirty-five to two hundred seconds after the timer starts (the period when the contact 394B is closed), the relay 670 will be energized to break the circuit to the pilot light 685 and energize the circuit to the alarm bell 374.

The operator may silence the alarm bell 374 by manually throwing the switch 690 to break the circuit to the alarm bell. When the switch 690 is thus thrown it automatically establishes a circuit to the red telltale light 384 as follows: L1, leads 378 and 386, red telltale light 384, leads 382 and 694, switch contact 690B and lead 696 to L2.

The timer contact 394C is adapted to energize the pebble elevator alarm circuit under the control of the differential pressure responsive controller 326 during the period from forty-five to two hundred seventy-five seconds after the starting of the timer motors, the period when the pebble elevator should normally be in operation. The circuit for energizing said alarm system comprises L1, lead 700, relay 702, lead 704, contact 326A of controller 326, leads 706 and 708, timer contact 394C and lead 710 to line 484. One side of each of the relay contacts 702A and 702B are connected by leads 712 and 714 to L2. The other side of the normally closed contact 702A is connected by a lead 716 to a green pilot light 718, the other side of which is connected by a lead 720 with L1. The other side of the normally open relay contact 702B is connected by lead 722 to one side of switch contact 724A of a manually operable double switch 724. The other side of the switch contact 724A is connected by a lead 726 to lead 372 which in turn is connected to the alarm bell 374.

If the contact 326A of unit 326 closes during the period when timer contact 394C is closed, the relay 702 will be energized to open relay contact 702A to break the circuit to pilot light 718, and simultaneously relay contact 702B will close to establish the circuit to the alarm bell 374.

The operator may silence the alarm bell by throwing the manually operable switch 724. When the switch 724 is thus thrown, it closes switch contact 724B to automatically establish a circuit to the red telltale light 384 as follows: L2, lead 728, switch contact 724B, lead 730 and lead 382 to the light 384 and from the light through leads 386 and 378 to L1.

As set forth above, each of the timer contacts 392C, 394D, 392B, 394B and 994C, and the timer motors 392M and 394M are connected to line 484 and thus through the double pole double throw switch 486 to line L2 for automatic operation of the various control circuits under the control of timers 392 and 394. If it is desired to deactivate the automatic control circuits, the switch 486 is thrown to disconnect line 484 from L2 and at the same time connect a line 750 to L2. The timer contacts 392C, 394D, 392B, 394B and 394C are adapted to be bypassed by a series of manually operable switches 752, 754, 756, 758 and 760, respectively, which bypass the timer contacts and connect their associated circuits to the line 750 as follows: switch 752 is adapted to bypass timer contact 392C and connect lead 530 to line 750 through a lead 762; switch 754 is adapted to bypass timer contact 394D and connect lead 616 to line 750 through a lead 764; switch 756 is adapted to bypass timer contact 392B and connect lead 642 with line 750 through a lead 766; switch 758 is adapted to bypass timer contact 394B and connect lead 676 with line 750 through a lead 768; and switch 760 is adapted to bypass timer contact 394C and connect lead 706 with line 750 through a lead 770.

Continuing now the description of the various electrical circuits and directing attention specifically to FIG. 6B, the first circuit shown therein is the low-fuel-flow alarm circuit. The control unit for this circuit is the flow indicating control unit 260 which as previously described is connected to the flow orifice 258 in the fuel line 250 (FIG. 1). The normally closed contact 260A of the unit 260 is wired in the circuit of a green pilot light 800, said circuit comprising: L1, line 802, light 800, line 804, contact 260A, line 806, line 808 to L2. If the fuel flow in the fuel line 250 falls below the set point of the unit 260, the contact 260A opens and the pilot light goes out. Simultaneously the contact 260B closes to complete the circuit to an alarm bell 810 as follows: L2, line 808, contact 260B, line 812, switch contact 814A of a manual switch 814, line 816, bell 810, line 818 to L1. As explained in connection with the alarm circuits described above, the operator may silence the alarm bell 810 by throwing the manual switch 814 to open the switch contact 814A. However, when the switch 814 is thrown to silence the bell 810, the switch contact 814B closes to complete a circuit to a red telltale light 820 as follows: L2, line 822, switch contact 814B, line 824, light 820, line 826, line 818 to L1, whereby, the red telltale light will always show when the alarm bell has been disengaged from the alarm circuit.

Figure 7:
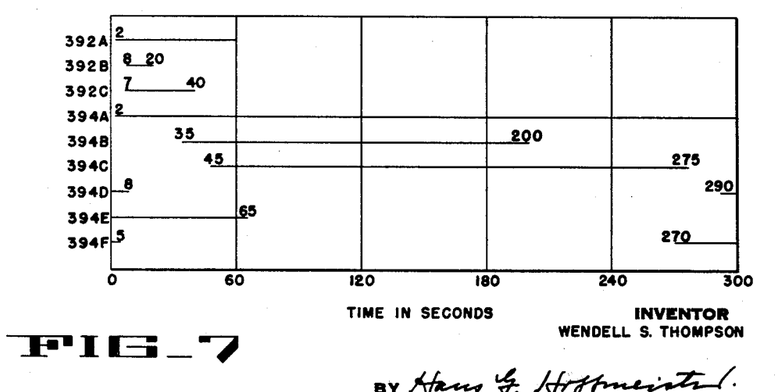
FIG. 7 is a timing chart for the contacts of the two main timer systems of the control assembly.

The next circuit is the low-pebble-level alarm circuit for the disengager. This circuit comprises a level responsive control unit 830 mounted in the disengager and adapted to be actuated when the level of the pebbles therein falls below a predetermined minimum. When the unit 830 is actuated it closes the contact 830A to complete a circuit to the coil of a relay 832 as follows: L1, line 834, contact 830A, line 836, relay 832, line 838, timer contact 394F and line 840 to L2. Reference to the timing chart, FIG. 7, shows that the timer contact 394F is opened from five seconds to two hundred and seventy seconds after initiation of the timer cycle. This is the period during which the pebbles are dropped from the disengager 24 onto the upper pebble bed, and the pebbles released through the furnace grate 12 are raised by the pebble elevator 26 to the disengager 24. During this period, the level in the disengager will normally fall below the set point of unit 830 and the timer contact 394F is opened to disable the alarm circuit.

The relay 832 has a normally closed contact 832A and a normally open contact 832B. The relay contact 832A is in the circuit to a green pilot light 842 as follows: from L1 through line 844, light 842, line 846, relay contact 832A, line 848, and line 850 to L2.

When the relay 832 is energized, the relay contact 832A opens to break the circuit to the pilot light 842, and simultaneously, the relay contact 832B closes to complete a circuit to the alarm bell 810 as follows: from L2 through line 850, relay contact 832B, line 852, switch contact 854A of a manual switch 854, line 856, line 816, bell 810 and line 818 to L1. As explained above in connection with the low fuel flow alarm circuit, the alarm bell 810 may be silenced by the operator by throwing the manual switch 854 to open the switch contact 854A. However, when the switch 854 is so thrown, it automatically closes the switch contact 854B to complete a circuit to the red telltale light 820 as follows: from L2 through line 860, switch contact 854B, line 862, line 824, light 820, line 826 and line 818 to L1.

The alarm system for indicating lack of flow of cooling water to the six burner jackets 108 comprises an interlock system having six flow responsive switch controllers 870, 872, 874, 876, 878 and 880, one associated with each of the burner jackets 108. The contacts 870A, 872A, 874A, 876A, 878A and 880A, respectively associated with the flow responsive control units, are connected together in series. One end of the series is connected by a line 882 to L2 and the other end of the series is connected by a line 884 to one side of a relay 886, the other side of which is connected by a line 888 to L1. From the circuits thus far described it is evident that the relay 886 remains energized only so long as all of the contacts 870A to 880A remain closed. The opening of any one of the contacts 870A to 880A by its associated control unit, in response to a failure of cooling fluid flow, will deenergize the relay 886 to activate the alarm circuit. A series of six manual switches 890, 892, 894, 896, 898 and 900 are provided with each of said switches being associated with and wired to bypass one of the controller actuated contacts 870A to 880A, respectively, whereby any one of the control units 870 to 880 may be cut out of the interlock system by closing its associated manual switch.

When the relay 886 is energized, the relay contact 886A is closed to complete a circuit from L1 through line 902, a green pilot light 904, line 906, relay contact 886A, line 908 and line 910 to L2. When the relay 886 is deenergized by the opening of any of the contacts 870A to 880A, the relay contact 886A opens thus extinguishing the pilot light 904 and, simultaneously, the relay contact 886B closes to activate a circuit to the alarm bell 810. The alarm circuit is as follows: from L2 through line 910, relay contact 886B, line 912, switch contact 914A of a manual switch 914, line 916, line 816, bell 810 and line 818 to L1. The operator may determine which of the units 870 to 880 has opened its associated contact 870A to 880A by successively closing the manual switches 890 to 900 until the alarm bell is silenced. As described above in connection with the other alarm circuits the alarm bell may be cut out of the circuit by throwing the manual switch 914. When said switch is so thrown, it automatically closes the switch contact 914B to complete a circuit to the red telltale light 820 as follows: from L2 through line 918, switch contact 914B, line 920, line 824, light 820, line 826 and line 818 to L1.

The alarm circuit for indicating a break in the flow of cooling fluid to the burners 100 is exactly the same as that described above in connection with the alarm for the cooling fluid flow to the burner jackets. The alarm circuit for the burner cooling fluid flow comprises six flow responsive control units 922, 924, 926, 928, 930 and 932, each associated with the cooling fluid flow to one of the burners 100. The six contacts 922A, 924A, 926A, 928A, 930A and 932A, associated with the control units, are connected in series and control the operation of the relay 934 whose contacts 934A and 934B actuate the green pilot light 936 and the alarm bell 810. A manual switch 938 is provided so that the operator may silence the alarm bell and again, as explained above, if the switch 938 is thrown to silence the bell 810, it automatically establishes a circuit for the red telltale light 820. As previously explained in connection with the alarm circuit for the jacket cooling fluid flow, six manual switches 940, 942, 944, 946, 948 and 950 are provided each bypassing one of the six contacts 922A to 932A, respectively.

The next circuit is the control circuit for the pebble elevator 26 (FIG. 1). This circuit is actuated by the level responsive control unit 298 mounted in the grate hopper 28 and is adapted to be actuated when the pebbles in the hopper 28 exceed a predetermined height therein. When the unit 298 is actuated it closes the contact 298A (FIG. 6B) and energizes a circuit to a green pilot light 952 as follows: from L1 through line 954, light 952, line 956, contact 298A and line 958 to L2. Closing of the contact 298A simultaneously energizes the time delay relay 300 through a circuit as follows: from L1 through line 960, relay 300, line 962, line 964, line 956, contact 298A, and line 958 to L2. The throw bar of the relay contact 300A is attached to a dash pot 966 whereby the relay contact 300A will not close until a predetermined time interval after the energizing of the relay. When the relay contact 300A closes it energizes a circuit to the solenoid operated valve 294 (FIGS. 1 and 6B) as follows: from L1 through line 968, solenoid valve 294, relay contact 300A, line 964, line 956, contact 298A and line 958 to L2. When the solenoid valve 294 is energized, it opens full to allow control air to reach the air operated valve 290 permitting the lift air to flow through conduit 286 to the pebble engager 32. As soon as the initial surge of air starts to flow through the conduit 286, the flow responsive controller 302 is actuated to close the contact 302A (FIG. 6B) and energize the circuit to the normally open solenoid actuated valve 296 as follows: from L1 through line 970, solenoid valve 296, line 972, contact 302A and line 974 to L2. When the valve 296 is actuated it partially closes to regulate the amount of control air to the valve 290 thus regulating the flow of air through the conduit 286 (FIG. 1).

The normal operation of the furnace, from the point of view of the pebble movement therethrough, is as follows: from the disengager 24 (FIG. 1) pebbles at about 350° F. move along the pebble supply line 20 into the hopper 70 at the upper end of the furnace 10 (FIGS. 1 and 2). Since the disengager acts as a reservoir the hopper 70 is kept filled. Every time the bridge is broken by the momentary interruption of the flow of process air, approximately seven cubic feet of pebbles are transferred across the combustion zone and an equal volume moves from the storage hopper 70 to the top of the air quenching bed D. The flow of process air is then reestablished and an equal volume of pebbles is removed through the grate 12. A new bridge is formed at the restricted throat 23 and the bottom bed A moves downwardly therefrom to reestablish the open combustion zone. As subsequent furnace cycles occur, the pebbles move downwardly in a stepwise fashion toward the bottom of the quenching bed. During their passage through the quenching bed D the pebbles are heated by the rising process air. Pebble temperatures range from about 350° F. at the top of the bed D to about 4200° F. at the bottom. The hot pebbles are then transferred across the combustion zone in the manner described above and become the top of the air preheat bed A. After a few furnace cycles, the pebbles are moved downwardly to the grate 12. During their passage through the preheat bed A, the pebbles are cooled by the process air. Their temperatures range from about 4200° F. at the top of the preheat bed A to about 400° F. at the bottom thereof.

After the pebbles are withdrawn through the grate 12 they are moved by the pebble transfer plate 90 to the pebble hopper 28. From the hopper 28 the pebbles travel through the conduit 30 to the engager 32 at the lower end of the pebble airlift elevator 26 by means of which they are raised to the disengager 24, thus completing the pebble cycle.

The normal operation of the furnace as viewed from the point of view of the process air is as follows: air from the main blowers (not shown) enters the main air conduit 150 (FIG. 1). The air in the main air conduit 150 is metered by adjustment of the valve 166. The air, after passing through the air operated flow valve 172, is divided with approximately 80% of the air being directed through conduits 174 and 16 to the grate 12 beneath the pebble discharge tubes 88. The remaining 20% of the process air flows through conduits 176, 182 and 14 to the plenum chamber 84.

The grate air supports the pebbles at the upper ends of the pebble discharge tubes 88 and then passes into the bottom of the furnace. The plenum air passes into the furnace through the bubble caps 86 to combine with the grate air. The combined stream then rises through the preheat bed A where it is heated by the pebbles. Air temperature will range from approximately 175° F. in the main air conduit 150 to approximately 200° F. at the bottom of the furnace and approximately 4000° F. at the top of the pebble bed A. In passing through the combustion zone C, the burning fuel will raise the process air stream temperature to about 4400° F. In this region, near-equilibrium conversion to nitric oxide occurs. The rich process gas stream then enters the bottom of the quenching bed D where it is rapidly cooled by contact with the cooler pebbles. The gas stream temperatures will range from approximately 4400° F. at the bottom of the quenching bed D to about 500° F. at the top. This stream then passes into the vent stack 18 and is carried to further gas recovery and treating equipment (not shown).

After the air circulation through the furnace has been established and an open combustion zone has been established by the formation of the bridge, the cycle of the furnace action is initiated through the temperature responsive controller 128 mounted in, or adjacent to, the vent stack 18. As explained above, when the temperature of the venting process gas stream reaches the lower of the three temperature set points of the unit 128, the contact 128A (FIG. 6A) closes and completes the circuit to the relay 402. The relay 402 then closes and starts the timer motor 390M (which has an internal holding circuit through the contact 390A) while the other contact 390B of timer 390 completes the circuit to energize the solenoid valve 213 which controls the admission of control air to the two air operated valves 184 and 192 (FIGS. 1 and 6A).

During low temperature operation the air supplied through conduit 16 is sufficient to cause the pebbles to bridge at the upper end of the grate tubes 88, valve 220 is open, and actuation of solenoid valve 218 causes valve 192 to open and valve 184 to close so that the plenum air supply is bypassed and the bridge is broken. However, during high temperature operation when the air flow through the grate tubes 88 must be increased above the normal furnace flow, valve 220 is closed to hold valve 184 permanently open, and valve 194 is adjusted to give a constant bypass flow around valve 192. Actuation of solenoid valve 218 then causes valve 192 to open to increase the plenum bypass air to break the bridge. In addition, solenoid valve 210 is wired in parallel with solenoid valve 218 so that, when solenoid valve 218 is actuated, solenoid valve 210 is also actuated to cause valve 172 to pulse momentarily to reduce the air flow to the furnace to collapse the bridge. The adjustment of valve 172 is critical and its setting should be done carefully to prevent collapsing the bridges at the grate.

When the relay 402 is energized by closing of the contact 128A, it also completes the circuit to energize the relay 454 through the contact 458B of relay 458. The relay 458, when energized by the closing of the timer contact 392C during the time of from seven seconds to forty seconds after the starting of the timing motor 392M in the manner described below, deenergizes the relay 454 by opening the relay contact 458B and ultimately allows the unit 128 to reset. Relay 454 is wired with an internal holding circuit through relay contact 454A and relay contact 458B to maintain its energized position until the relay 458 is energized. This is necessary because of the independent action of the unit 128 in causing the collapse of the bridge and drawing cold pebbles from the storage hopper 70 onto the top of the quenching bed D, which cold pebbles will quickly reduce the stack temperature and cause the contact 128A to open. The control circuit through the relay contact 454B of the relay 454 controls the start of operation of the timers 392 and 394 through the relay contacts 472A and 472B, respectively, of the normally energized relay 472. As explained above in the detailed description of the electric circuits, the temperature responsive controller 122 is connected in the energizing circuit of the relay 472 whereby, if the pebble temperature adjacent the grate 12 is too high, the contact 122A will open to deenergize the relay 472 and prevent the start of the timer motors 392M and 394M. Thus, when the stack temperature reaches the lowest set point of the control unit 128, the bridge is always dropped, but the timers 392 and 394 are started only if it is safe to withdraw the pebbles through the grate. If it is not safe (evidenced by the pebble bed temperature being above the set point of the unit 122) then the timers 392 and 394 will not be started even though the bridge has been collapsed.

As explained in detail above in connection with the individual wiring circuits, the timer contact 392B closes during the period from eight to twenty seconds after the initiation of the action of the timer motor 392M and controls the action of the valves 178 and 180 to permit pebbles to be discharged through the grate 12 onto the conveying plate 90. The timer contact 394B closes during the period of from 35 to 200 seconds after the initiation of the action of the timer motor 394M and activates the bridge location alarm circuit described above and simultaneously energizes the relay 650 to activate the conveying plate drive motor 92 to cause the pebbles to be discharged from the conveying plate 90 into the hopper 28.

The timer contact 394C is closed during the period of from 45 to 275 seconds after the start of the timer motor 394M and activates the pebble elevator alarm circuit during this period when the pebble elevator should normally be operating.

The timer contact 394D opens at the end of 8 seconds and again closes at 290 seconds after the start of the timer motor 394M thus deactivating the high temperature alarm circuit adjacent the grate 12 during the period when high temperature pebbles would normally be passing through the grate.

The timer contact 394E is normally closed during the period from 0 to 65 seconds and is open during the period from 65 to 300 seconds after the start of the timer motor 394M. This contact is in the energizing circuit of the timer motor 392M and thus prevents the restart of the one minute timer 392 until after the five minute cycle of the timer 394 has been completed.

The timer contact 394F is open during the period from 5 to 270 seconds after the start of the timer motor 394M to deactivate the low pebble alarm circuit associated with the disengager hopper 22 of the disengager 24 during the period when the pebble level in the hopper 22 would normally be low.

From the foregoing description it may be seen that a novel form of furnace for the treatment of gases, and in particular for the thermal fixation of atmospheric nitrogen, has been provided. In this furnace pebble bed fouling is eliminated by the slow movement of the pebbles through the pebble beds and by the external cleaning of the pebbles in the air lift elevator. The provision of an open combustion zone due to the formation of the upper pebble bridge B makes possible the efficient introduction of fuel through the side walls of the furnace. Further the above described automatic control system assures efficient, safe operation of this high temperature installation.

While the furnace disclosed herein has been described in connection with the thermal fixation of atmospheric nitrogen, it should be apparent to those skilled in the art that it is adaptable to the treatment of other gases, and further that the same construction and general manner of operation is adaptable for the treatment of the pebbles or other solid materials being passed through the furnace.

While a preferred embodiment of the instant invention has been shown and described herein, it should be noted that various changes may be made therein without departing from the spirit of the invention as defined in the appended claims.

Having thus described my invention what I claim and desire to secure by Letters Patent is:

1. In a furnace for the thermal treatment of a gas, refractory means defining a substantially vertical passageway having a zone of restricted cross-sectional area, a plurality of gas inlet conduits disposed at the lower end of said passageway, a plate disposed at the lower end of said passageway and having a plurality of gas inlet ports communicating with said passageway, means for delivering a plurality of pebbles to said passageway, a first means for directing gas upwardly through said conduits to cause the pebbles to bridge at the upper ends of said conduits, a second means for directing gas upwardly through said gas inlet ports to supplement the gas passing upwardly from said conduits and increase the total volume of gas passing upwardly through the passageway to the quantity required to cause said pebbles to also form a bridge at said restricted zone, and means in said first and second directing means for decreasing the volume of gas passing upwardly through said conduits to a quantity below that necessary to maintain the bridges at the upper ends of said conduits and increasing the quantity of supplementary gas proportionately to maintain the total quantity of gas passing upwardly through said passageway at or above the quantity necessary to maintain the bridge at said restricted zone.

2. A furnace for the thermal treatment of a gas comprising, refractory means defining a substantially vertically extending passageway, said passageway having a throat of restricted cross-sectional area adjacent its central portion, means for introducing pebbles of heat-exchange solids into the upper end of said passageway, grate means for removing pebbles from the lower end of said passageway, said grate means comprising a plurality of vertically extending tubes, first means for directing gas to be processed into the lower end of said passageway through the tubes in said grate to cause said pebbles to bridge at the upper ends of said grate tubes, second means for directing gas to be processed into the lower end of said passageway whereby the combined gas flow causes bridging adjacent said throat and thereby separates said pebbles into two distinct beds with an open combustion zone therebetween, means for venting said gas from the top of said passageway, means for introducing fuel into said combustion zone, means in said first and second directing means responsive to the temperature of said gas adjacent said venting means for momentarily reducing the gas flow through said passageway to cause said bridge adjacent said throat to collapse when said temperature reaches a predetermined value, and means for subsequently reducing the gas flow through said grate tubes while maintaining constant flow through said passageway to permit pebbles to be discharged through said grate while reestablishing and maintaining said bridge adjacent said throat.

3. A furnace for the thermal treatment of a gas comprising, refractory means defining a substantially vertically extending passageway, said passageway having a throat of restricted cross-sectional area adjacent its central portion, means for introducing pebbles of heat-exchange solids into the upper end of said passageway, grate means for removing pebbles from the lower end of said passageway, said grate means comprising a pair of vertically spaced horizontal plates forming the top and bottom of a plenum chamber, openings in said top plate for admitting gas from said plenum chamber into said passageway, a plurality of vertically extending tubes extending through said plenum chamber and sealed to said plates, means for directing gas to be processed into the lower end of said passageway through the tubes in said grate to cause said pebbles to bridge at the upper ends of said tubes, means for directing gas into said plenum chamber, the combined gas stream in said passageway causing said pebbles to bridge adjacent said throat and thereby separate said pebbles into two distinct beds with an open combustion zone therebetween, and means for introducing fuel into said combustion zone.

4. A furnace for the thermal treatment of a gas comprising, refractory means defining a substantially vertically extending passageway, said passageway having a throat of restricted cross-sectional area adjacent its central portion, means for introducing pebbles of heat-exchange solids into the upper end of said passageway, grate means for removing pebbles from the lower end of said passageway, said grate means comprising a pair of vertically spaced horizontal plates forming the top and bottom of a plenum chamber, openings in said top plate for admitting gas from said plenum chamber into said passageway, a plurality of vertically extending tubes extending through said plenum chamber and sealed to said plates, means for admitting gas to be processed into the lower end of said passageway through the tubes in said grate in sufficient quantity to cause said pebbles to bridge at the upper ends of said tubes, means for admitting gas to said plenum chamber, the combined gas stream in said passageway being sufficient in quantity to cause said pebbles to bridge adjacent said throat and thereby separate said pebbles into two distinct beds with an open combustion zone therebetween, means for venting said gas from the top of said passageway, means for introducing fuel into said combustion zone, means responsive to the temperature of said gas adjacent said venting means for momentarily reducing the gas flow to said plenum chamber to reduce the total flow through said passageway and collapse the bridge adjacent said throat when said temperature reaches a predetermined value, and means for subsequently reducing the gas flow through said grate tubes and simultaneously increasing the gas flow to said plenum chamber to maintain a constant total flow in said passageway to maintain the bridge adjacent said throat while permitting pebbles to be discharged through said grate tubes.

5. The method of operating a furnace having a vertical bore therethrough including a zone of restricted cross-sectional area intermediate its ends, which comprises introducing pebbles into said bore at the upper end thereof, directing a gas upwardly through said bore so that the velocity thereof at said restricted zone creates a dynamic pressure which supports and causes bridging of said pebbles at said zone, withdrawing a predetermined amount of pebbles from the lower end of said bore to cause the pebbles below said bridge to fall away from said bridge to form two distinct pebble beds with an open combustion chamber therebetween, and introducing fuel to said combustion zone.

6. The method of operating a furnace having a vertical bore therethrough with a zone of restricted cross-sectional area intermediate its ends, which comprises introducing pebbles into said bore at the upper end thereof, directing a gas upwardly through said bore so that the velocity thereof at said restricted zone creates an upwardly directed dynamic pressure which causes bridging of said pebbles at said zone, withdrawing a predetermined amount of pebbles from the lower end of said bore to cause the pebbles below said bridge to fall away from said bridge to form two distinct pebble beds with an open combustion chamber therebetween, periodically momentarily reducing the flow of gas to allow said bridge to collapse, re-establishing said gas flow after each reduction thereof to establish a new bridge, and again withdrawing a predetermined amount of pebbles from the lower end of said bore after each establishment of a new bridge to reopen said combustion zone.

7. The method of operating a furnace having a vertical bore therethrough with a zone of restricted cross-sectional area intermediate its ends, a plenum chamber closing its lower end for introducing gas to said bore, and a plurality of vertical pebble discharge tubes extending through said plenum chamber, said method comprising the steps of introducing pebbles into said bore at the upper end thereof, directing gas upwardly through the pebble discharge tubes to cause the pebbles to bridge at the upper ends of the tubes, introducing additional gas to the bore from the plenum chamber so that the velocity of the combined gas stream flowing upwardly through the bore at the restricted zone creates an upwardly directed dynamic pressure causing said pebbles to bridge at said zone, simultaneously reducing the gas flow through the pebble discharge tubes while increasing the flow through the plenum chamber so that the total flow through the vertical bore remains constant to support the bridge at the restricted zone while the bridges at the upper ends of the pebble discharge tubes collapse, permitting pebbles to discharge therefrom so that the pebbles beneath the bridge at the restricted zone will drop away therefrom to form two distinct pebble beds with an open combustion chamber therebetween, re-establishing the initial gas velocities in the pebble discharge tubes and the plenum chamber to reform the bridges at the upper ends of the pebble discharge tubes, and introducing fuel into the combustion chamber.

8. The method of operating a furnace having a vertical bore therethrough with a zone of restricted cross-sectional area intermediate its ends, a plenum chamber closing its lower end for introducing gas to said bore, and a grate structure including a plurality of vertical pebble discharge tubes extending through said plenum chamber, said method comprising the steps of introducing pebbles into said bore at the upper end thereof, directing gas upwardly through said pebble discharge tubes to cause said pebbles to bridge at the upper end thereof, introducing additional gas to said bore from said plenum chamber so that the velocity of the combined gas stream flowing upwardly through said bore at said restricted zone creates an upwardly directed dynamic pressure which causes said pebbles to bridge at said zone, simultaneously reducing the gas flow through said pebble discharge tubes while increasing the flow through said plenum chamber so that the total flow through said vertical bore remains constant to support the bridge at said restricted zone while the bridges at the upper ends of said pebble discharge tubes collapse permitting pebbles to discharge therefrom so that the pebbles beneath said bridge at said restricted zone will drop away therefrom to form two distinct pebble beds with an open combustion chamber therebetween, re-establishing the initial gas velocities in said plenum chamber and said pebble discharge tubes to reform the bridges at the upper ends of said pebble discharge tubes, periodically momentarily reducing the flow of gas through said bore to allow the bridge at said restricted zone to collapse, re-establishing said total gas flow after each reduction thereof to establish a new bridge at said restricted zone, and repeating the steps for withdrawing pebbles through said grate structure after each establishment of a new bridge to reopen said combustion zone.

9. The method of operating a furnace grate having a plurality of vertically disposed pebble discharge tubes communicating with the interior of said furnace adjacent the bottom thereof, which comprises directing gas upwardly through said pebble discharge tubes to cause said pebbles to bridge at the upper end thereof, reducing the gas flow through said pebble discharge tubes so that the bridges at the upper ends of the pebble discharge tubes collapse permitting pebbles to discharge therefrom, and subsequently re-establishing the initial gas velocity in said pebble discharge tubes to reform the pebble bridges at their upper ends.

10. In a furnace for the thermal treatment of a gas, refractory means defining a substantially vertical passageway having upper and lower chambers and a zone of restricted cross-sectional area therebetween, a plate mounted at the lower end of said passageway and having a plurality of gas inlet ports communicating with said passageway, a plurality of substantially vertical gas inlet conduits extending through said plate at the lower end of said passageway, pebbles in said upper and lower chambers, means coupled to said inlet conduits for directing gas through said conduits to cause said pebbles to form bridges at the upper ends of said conduits, and means communicating with said inlet ports for directing gas through said inlet ports so that the total air flow through said vertical passageway causes support and bridging of said pebbles at said restricted zone of said passageway to support the pebbles in said upper chamber independently of the pebbles in said lower chamber.

11. In a furnace for the thermal treatment of a fluid, wall means circumscribing an upstanding passageway having upper and lower chambers interconnected by a throat whose cross-sectional area is less than that of said chambers, said upper chamber providing a fluid outlet spaced upward from said throat, a grate spanning said passageway under said lower chamber and providing fluid conducting means communicating with said passageway, fluid pressure means in fluid communication with said fluid conducting means for forcing a fluid stream upwardly through said passageway and out of said outlet, a lower bed of pebbles of heat-exchanging solids supported on said grate in said lower chamber, an upper bed of pebbles of heat-exchanging solids in said upper chamber and said throat, said upper bed being supported by said fluid stream in upwardly spaced relation to the upper surface of said lower bed so that an open combustion chamber is provided between said upper and lower beds, and means projecting into said combustion chamber for establishing combustion therein.

12. In a furnace for the thermal treatment of a fluid, wall means circumscribing an upstanding passageway having upper and lower chambers interconnected by a throat whose cross-sectional area is less than that of said chambers, said upper chamber providing a fluid outlet spaced upward from said throat, a grate spanning said passageway under said lower chamber and providing an upstanding pebble conduit and a fluid port both of which communicate with said passageway and open outward therefrom, a fluid pressure source, first fluid conductor means in fluid communication with said pressure source and said conduit and second fluid conductor means in fluid communication with said pressure source and said port for forcing a predetermined total fluid flow upwardly through said passageway and out of said outlet, a lower bed of pebbles of heat-exchanging solids supported on said grate in said lower chamber with the pebbles supported in a lower bridge over said conduit by the flow issuing upwardly through said conduit, and an upper bed of pebbles of heat-exchanging solids in said upper chamber and said throat and supported in an upper bridge across said throat by said total fluid flow, said lower bed being spaced below said upper bridge so that an open combustion chamber is provided between said upper and lower beds, said first and second fluid conductor means including means for successively reducing said predetermined flow to collapse said upper bridge, subsequently for reducing the flow through said conduit while simultaneously increasing the flow through said port to collapse said lower bridge and release pebbles downwardly through said conduit while re-establishing said upper bridge, and thence for respectively decreasing and increasing flow through said conduit and port to re-establish said lower bridge and maintain said upper bridge.

13. A method for providing an open combustion zone between upper and lower chambers of a furnace having a restricted throat interconnecting said chambers, said chambers being filled with pebbles of heat-exchanging solids, comprising the steps of forcing a stream of fluid upwardly through said lower chamber, said throat, and said upper chamber so that the dynamic pressure of the fluid at said throat supports the pebbles in said throat and said upper chamber, and releasing pebbles from said lower chamber to allow the pebbles in said lower chamber to fall away from the pebbles which are supported by said fluid stream thereby to establish said combustion zone between upper and lower beds of pebbles in said upper and lower chambers, respectively.

References Cited in the file of this patent

UNITED STATES PATENTS

| | | |
|---|---|---|
| 2,447,306 | Bailey et al. | Aug. 17, 1948 |
| 2,512,259 | Pike | June 20, 1950 |
| 2,553,561 | Evans | May 22, 1951 |
| 2,619,412 | Hendrickson | Nov. 25, 1952 |
| 2,625,463 | Norton | Jan. 13, 1953 |
| 2,657,124 | Gaucher | Oct. 27, 1953 |
| 2,676,095 | De Vaney et al. | Apr. 20, 1954 |